United States Patent
Karst

(10) Patent No.: US 12,075,729 B2
(45) Date of Patent: Sep. 3, 2024

(54) AUTOMATED HEADER FLOAT OPTIMIZATION AND FIELD LEARNING FOR A WORK VEHICLE

(71) Applicant: DEERE & COMPANY, Moline, IL (US)

(72) Inventor: Austin J. Karst, Ottumwa, IA (US)

(73) Assignee: Deere & Company, Moline, IL (US)

( * ) Notice: Subject to any disclaimer, the term of this patent is extended or adjusted under 35 U.S.C. 154(b) by 902 days.

(21) Appl. No.: 17/008,312

(22) Filed: Aug. 31, 2020

(65) Prior Publication Data

US 2022/0061218 A1 Mar. 3, 2022

(51) Int. Cl.
*A01D 75/18* (2006.01)
*A01B 63/00* (2006.01)
*A01B 63/10* (2006.01)
*F15B 15/14* (2006.01)

(52) U.S. Cl.
CPC ............ *A01D 75/18* (2013.01); *A01B 63/008* (2013.01); *A01B 63/10* (2013.01); *F15B 15/14* (2013.01)

(58) Field of Classification Search
CPC ...... A01D 75/18; A01B 63/008; A01B 63/10; F15B 15/14
See application file for complete search history.

(56) References Cited

U.S. PATENT DOCUMENTS

| | | |
|---|---|---|
| 8,863,484 B2 | 10/2014 | Patterson et al. |
| 2001/0016788 A1* | 8/2001 | Hauwiller ............ A01B 79/005 700/283 |
| 2016/0360697 A1 | 12/2016 | Diaz |
| 2018/0042173 A1 | 2/2018 | Henson |
| 2018/0042176 A1 | 2/2018 | Obropta et al. |
| 2018/0047177 A1 | 2/2018 | Obropta et al. |
| 2019/0041973 A1 | 2/2019 | Maheshwari et al. |
| 2019/0327893 A1 | 10/2019 | Hamilton et al. |
| 2020/0337240 A1* | 10/2020 | Brimeyer ............ A01D 41/127 |
| 2020/0375107 A1 | 12/2020 | Duerkesen et al. |
| 2022/0061218 A1 | 3/2022 | Karst |

* cited by examiner

*Primary Examiner* — Andrew J Cromer
(74) *Attorney, Agent, or Firm* — Michael Best & Friedrich LLP

(57) ABSTRACT

A work vehicle includes a chassis, and a work implement movably coupled to the chassis, the work implement configured to perform a field-engaging function. The work vehicle also includes an actuator coupled to the work implement and configured to adjust a position of the work implement relative to a ground surface, and a controller in communication with a communication module. The controller is configured to monitor a location of the work machine via the communication module, and load a field map that identifies spatial information about a corresponding field, and a characteristic of the actuator associated with the spatial information. The controller is further configured to partition the spatial information into at least one pass traversable by the work machine. The controller is also configured to create an adjustment event to adjust the actuator in response to the location of the work machine moving within the at least one pass.

19 Claims, 14 Drawing Sheets

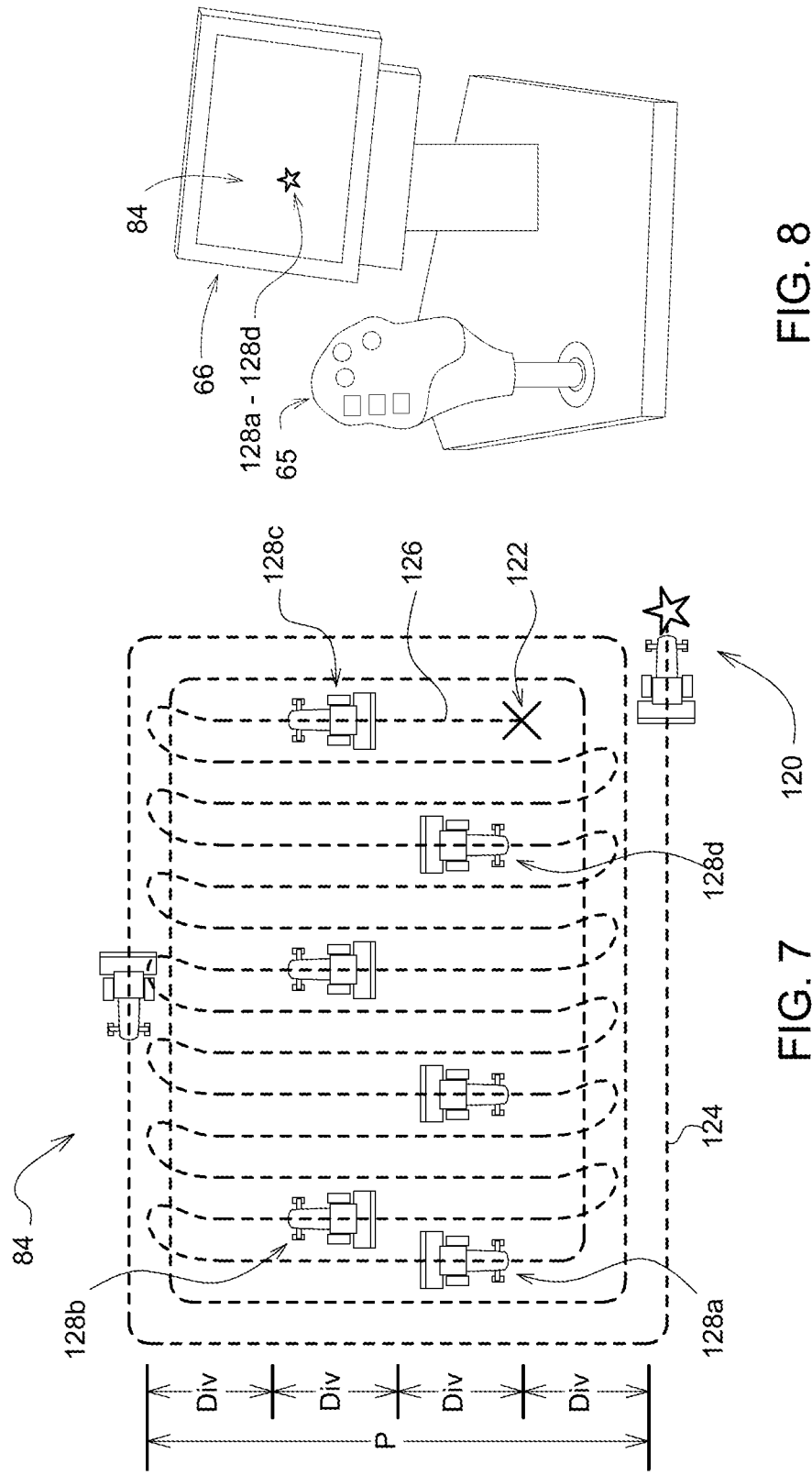

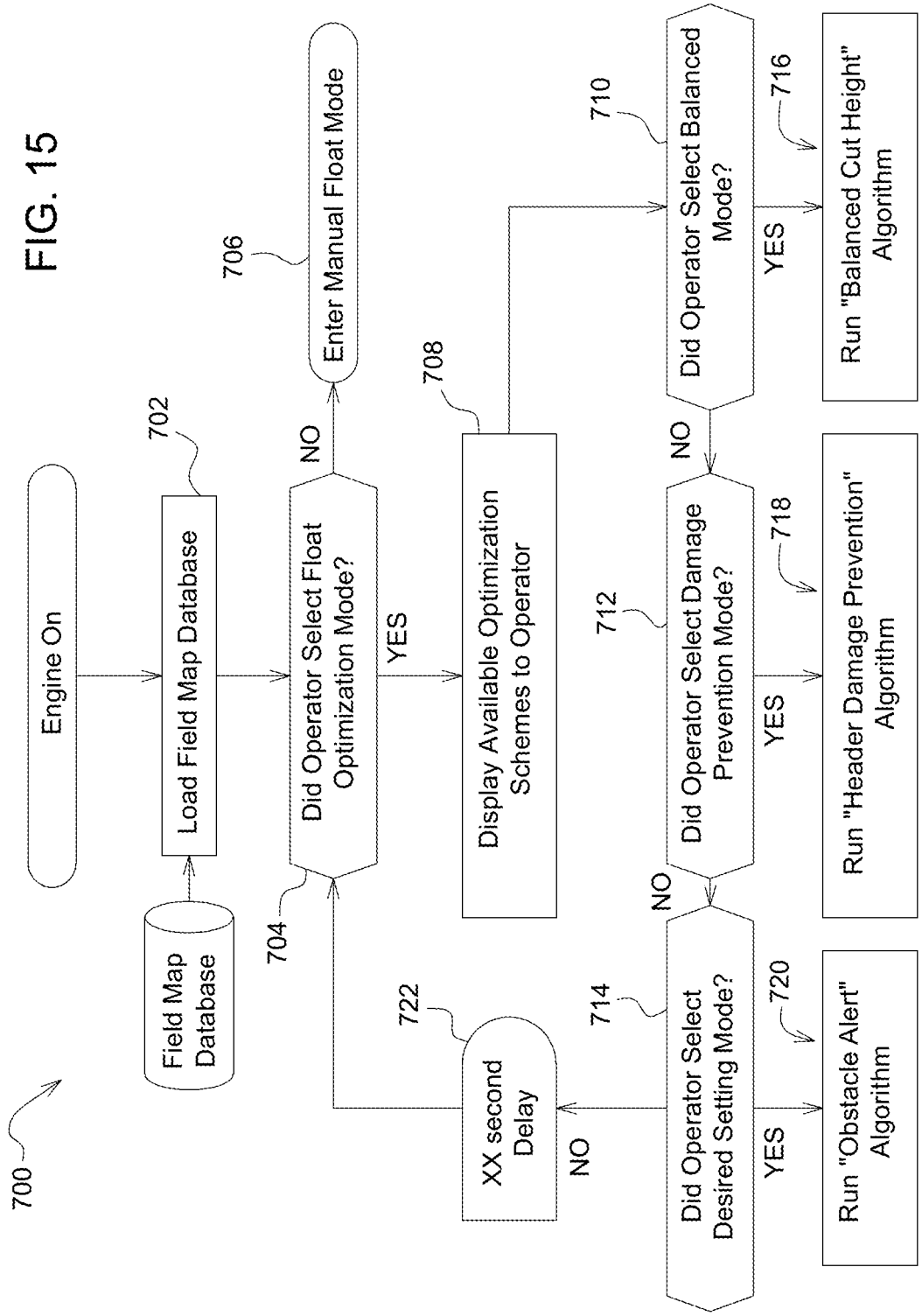

AUTOMATED HEADER FLOAT OPTIMIZATION AND FIELD LEARNING FOR A WORK VEHICLE

FIELD

The present disclosure relates to a work implement adjustment system for a work vehicle.

BACKGROUND

Many industrial work machines, such as farming equipment, use hydraulics to control various moveable implements. The operator is provided with one or more input or control devices operably coupled to one or more hydraulic actuators, which manipulate the relative location of select components or devices of the equipment to perform various operations. For example, windrowers may be utilized in cutting crops. A windrower may include a header attachment pivotally coupled to a chassis. One or more hydraulic cylinders are coupled to the header attachment and move the header attachment between positions relative to the chassis.

SUMMARY

In one embodiment, the disclosure provides a work vehicle that includes a chassis, and a work implement movably coupled to the chassis, the work implement configured to perform a field-engaging function. The work vehicle also includes an actuator coupled to the work implement and configured to adjust a position of the work implement relative to a ground surface. The work vehicle further includes a controller in communication with a communication module. The controller is configured to monitor a location of the work machine via the communication module. The controller is also configured to load a field map from a field map database, the field map identifying spatial information about a corresponding field, and a characteristic of the actuator associated with the spatial information. The controller is further configured to partition the spatial information into at least one pass traversable by the work machine in the field. The controller is also configured to determine whether an average value of the characteristic of the actuator for the at least one pass is greater than or less than a predetermined value. The controller is further configured to, in response to the average value of the characteristic of the actuator for the at least one pass being greater than the predetermined value, create a first adjustment event to adjust the actuator in response to the location of the work machine moving within the at least one pass. The controller is also configured to, in response to the average value of the characteristic of the actuator for the at least one pass being less than the predetermined value, create a second adjustment event to adjust the actuator in response to the location of the work machine moving within the at least one pass.

In another embodiment, the disclosure provides a work vehicle that includes a chassis, and a work implement movably coupled to the chassis, the work implement configured to perform a field-engaging function. The work vehicle also includes an actuator coupled to the work implement and configured to adjust a position of the work implement relative to a ground surface. The work vehicle further includes a controller in communication with a communication module. The controller is configured to monitor a location of the work machine via the communication module. The controller is also configured to load a field map from a field map database, the field map identifying spatial information about a corresponding field, and at least one impact event associated with the spatial information, the at least one impact event comprising a geotagged location and a characteristic of the work machine associated with the geotagged location. The controller is further configured to partition the spatial information into at least one pass traversable by the work machine in the field, and attribute the at least one impact event to the at least one pass. The controller is also configured to determine whether the characteristic of the work machine for the at least one impact event is greater than or less than a predetermined value. The controller is further configured to, in response to the characteristic of the work machine for the at least one impact event being greater than the predetermined value, create a first adjustment event to adjust the actuator in response to the location of the work machine moving within the at least one pass and approaching within a predetermined distance from the geotagged location. The controller is also configured to, in response to the characteristic of the work machine for the at least one impact event being less than the predetermined value, create a second adjustment event to adjust the actuator in response to the location of the work machine moving within the at least one pass and approaching within the predetermined distance from the geotagged location.

In another embodiment, the disclosure provides a work vehicle that includes a chassis, and a work implement movably coupled to the chassis, the work implement configured to perform a field-engaging function. The work vehicle also includes an actuator coupled to the work implement and configured to adjust a position of the work implement relative to a ground surface. The work vehicle further includes a controller in communication with a communication module. The controller is configured to monitor a location of the work machine via the communication module. The controller is also configured to load a field map from a field map database, the field map identifying spatial information about a corresponding field, a first impact event associated with the spatial information, the first impact event comprising a first geotagged location, and a second impact event associated with the spatial information, the second impact event comprising a second geotagged location. The controller is further configured to partition the spatial information into at least one pass traversable by the work machine in the field along a travel direction, and attribute the first geotagged location and the second geotagged location to the at least one pass sequentially along the travel direction. The controller is also configured to determine whether the second geotagged location is located within a predetermined minimum distance from the first geotagged location along the travel direction. The controller is further configured to, in response to the second geotagged location being located within a predetermined minimum distance from the first geotagged location along the travel direction, maintain a mapped setting of the actuator in response to the location of the work machine moving within the at least one pass and approaching within a predetermined distance from the second geotagged location along the travel direction.

Other aspects of the disclosure will become apparent by consideration of the detailed description and accompanying drawings.

BRIEF DESCRIPTION OF THE DRAWINGS

FIG. 7 is a schematic field map generated by the obstacle detection and field mapping module.

FIG. 8 is a perspective view of a control screen and various operator input mechanisms of the windrower of FIG. 1.

FIGS. 7-15 are flow charts of an obstacle detection and field mapping module for the control system.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways.

Figure 1:
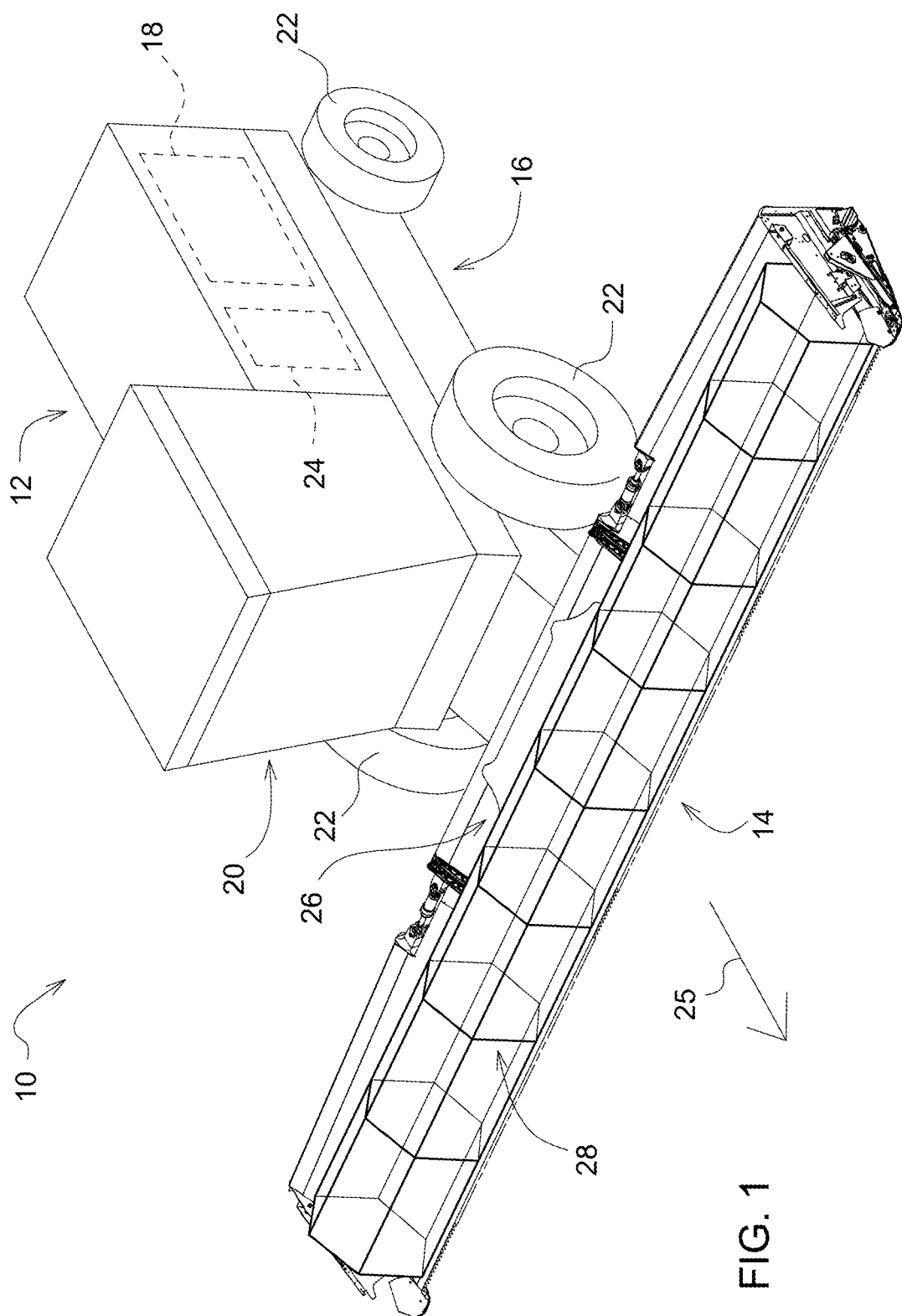
FIG. 1 is a perspective view of a windrower.

FIG. 1 illustrates an embodiment of a work machine depicted as a self-propelled windrower 10. The present disclosure is not limited, however, to a windrower and may extend to other industrial machines such as, e.g., a combine harvester, or any other work machine. As such, while the figures and forthcoming description may relate to a windrower, it is to be understood that the scope of the present disclosure extends beyond a windrower and, where applicable, the term "machine" or "work machine" will be used instead. The term "machine" or "work machine" is intended to be broader and encompass other vehicles besides a windrower for purposes of this disclosure.

The illustrated windrower 10 includes a tractor 12 and a work implement such as a header 14 coupled to the tractor 12. The header 14 is configured to perform a field-engaging function in a field. For example, in some embodiments, the header 14 may be configured to cut crops in a field (e.g., hay, small grain crops, etc.). In other embodiments, the work implement may be configured to gather crops that are already cut, to till the field, to plant seeds in the field, and the like. In such embodiments, the work implement may comprise a header for a cotton harvester, a combine, a forage harvester, a sugar cane harvester, and the like. The work implement may also comprise a feed system for a bailer, or seeding or tillage equipment. The systems and methods for header float optimization and field learning described herein with regard to the header 14 of the windrower 10 are likewise applicable to these and other work implements.

The tractor 12 includes a chassis 16, a prime mover 18, an operator cab 20, a plurality of ground-engaging devices 22, and a control system 24. The prime mover 18 is configured to move the tractor 12 in a direction of travel 25 via the ground engaging devices 22. The illustrated ground-engaging devices 22 are wheels, but tracks or other suitable ground-engaging devices can be utilized. The chassis 16 supports the prime mover 18 and the control system 24. The prime mover 18 can include an engine, such as a diesel engine, and the control system 24 can include a vehicle control unit (VCU).

A vehicle operation system (not shown) is positioned in the cab 20 and can include different combinations of a steering wheel, control levers, joysticks, control pedals, control buttons, control displays, and other input devices. The operator can actuate one or more controls of the vehicle operation system for purposes of operating movement of the windrower 10 and the different components of the header 14.

Figure 2:
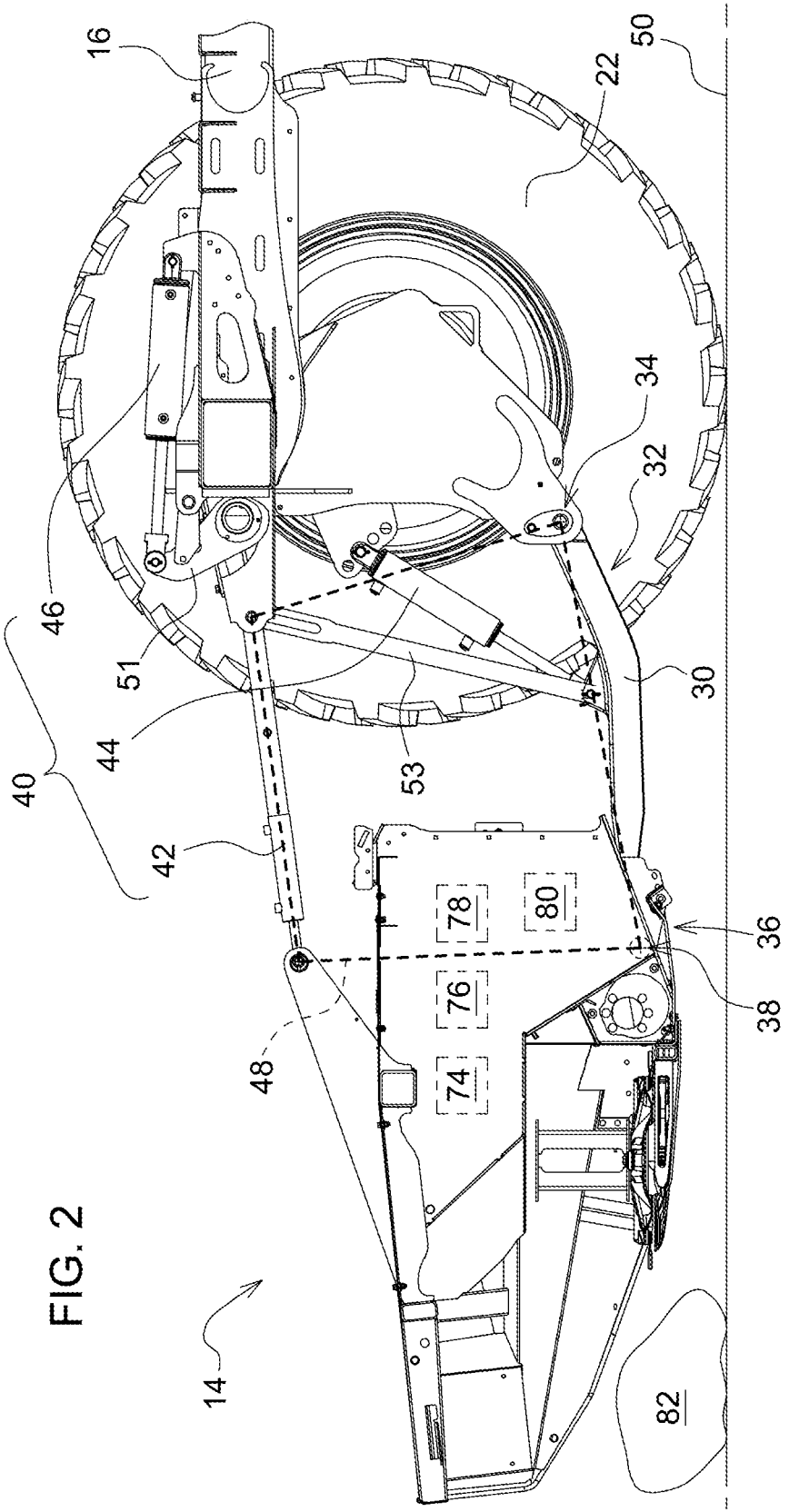
FIG. 2 is a schematic side view of a header of the windrower of FIG. 1.
Figure 3:
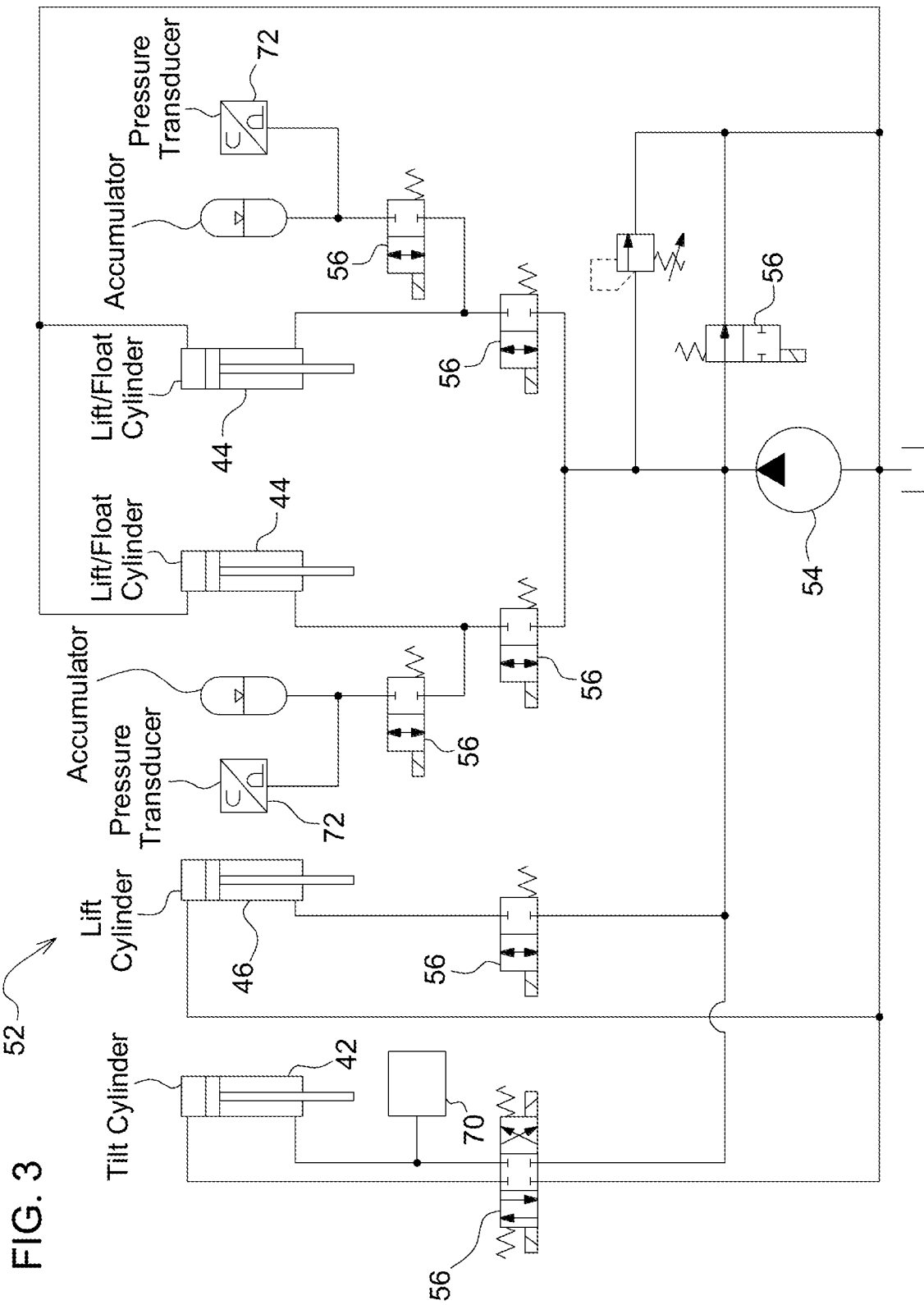
FIG. 3 is a schematic of a hydraulic system for the windrower of FIG. 1.

With reference to FIGS. 2 and 3, the header 14 includes a frame 26, and a cutter bar 28 coupled to the frame 26 and operably coupled to the prime mover 18. The prime mover 18 powers the cutter bar 28 to perform a cutting operation to cut crops in a field (e.g., hay, small grain crops, etc.). The header 14 is moveably connected to the chassis 16 by one or more arms 24 (only one being shown in FIG. 2) having a first end 32 pivotably coupled to the chassis 16 at a first pivot location 34, and a second end 36 pivotably coupled to the header 14 at a second pivot location 38.

The header 14 is further coupled to the chassis 16 by a plurality of actuators 40. The actuators 40 are operable to adjust the position and the orientation of the header 14 relative to the chassis 16. In some constructions, the actuators 40 can include hydraulic cylinders, electric motorized actuators, mechanical spring assemblies, and the like. In the embodiment illustrated in FIGS. 2 and 3, the actuators 40 include a tilt cylinder 42, one or more float cylinders 44, and a lift cylinder 46. The arms 30, the header 14, the tilt cylinder 42, and the chassis 16 form a four-bar linkage 48.

The tilt cylinder 42 is configured as a single double-acting hydraulic tilt cylinder 42 that extends or retracts to adjust a tilt angle defined between the cutter bar 28 and a ground surface 50, and thereby makes refinements in a cut height of the crop being cut. Specifically, actuation of the tilt cylinder 42 causes the cutter bar 28 to pivot relative to the arms 30 about the second pivot location 38.

The float cylinders 44 (only one is shown in FIG. 2) are configured as single-acting hydraulic float cylinders 44 that connect the chassis 16 and the arms 30. The float cylinders 44 at least partially support a weight of the header 14, and actuation of the float cylinders 44 tends to cause the arms 30 to pivot relative to the chassis 16 about the first pivot location 34. In the construction illustrated in FIGS. 2 and 3, the windrower 10 includes two float cylinders 44 that support the weight of the header 14 and enable the header 14 to follow the ground surface 50 over changing terrain. Moreover, in the construction illustrated in FIGS. 2 and 3, the lift cylinder 46 is a separate component from the float cylinders 44 that is coupled between the chassis 16 and a rockshaft 51 pivotably coupled to the chassis 16. In turn, the rockshaft 51 is coupled to the arms 30 via a slotted lift link 53. The lift cylinder 46 is configured to extend or retract to lower or raise the header 14 relative to the ground surface 50.

FIG. 3 illustrates a partial schematic of an embodiment of a hydraulic system 52 configured to supply fluid to implements of the windrower 10, including the actuators 40 comprising the tilt cylinder 42, the float cylinders 44, and the lift cylinder 46. A basic layout of a portion of the hydraulic system 52 is shown for clarity and one of ordinary skill in the art will understand that different hydraulic, mechanical, and electrical components can be used depending on the machine and the moveable implements.

The hydraulic system 52 includes at least one pump 54 that supplies fluid, for example hydraulic oil, to one or more downstream components. The pump 54 can be capable of providing an adjustable output, for example a variable displacement pump or variable delivery pump. Although only a single pump 54 is shown, two or more pumps may be used depending on the requirements of the system and the work machine.

In the illustrated embodiment, the hydraulic system also includes a plurality of valves 56 in fluid communication with the pump 54 such that the pump 54 delivers fluid to valves 56. In some embodiments, the valves 56 are electrohydraulic valves that receive the hydraulic fluid from the pump 54 and control the delivery of the hydraulic fluid to the actuators 40 including the tilt cylinder 42, the float cylinders 44, and the lift cylinder 46.

Figure 4:
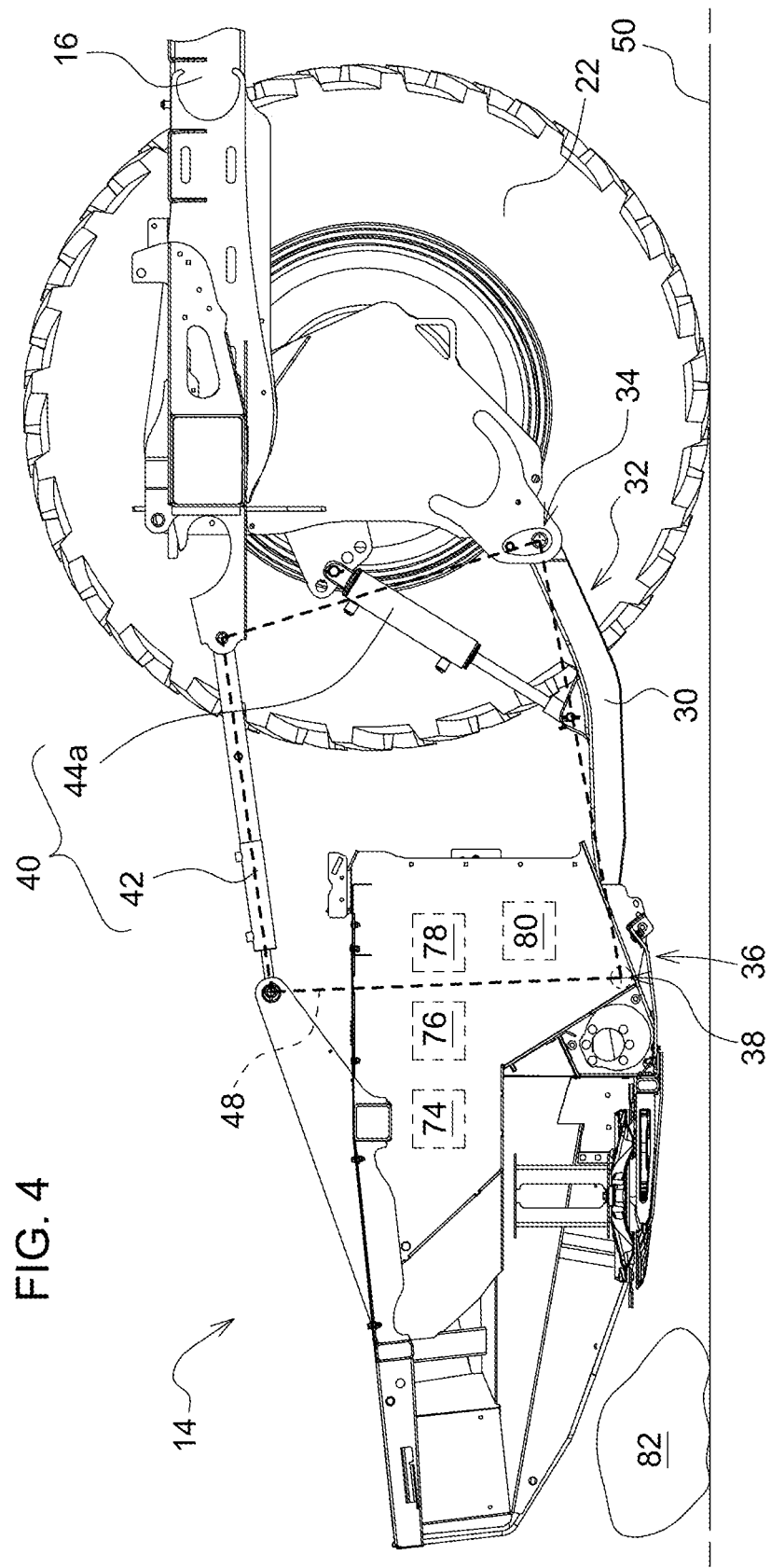
FIG. 4 is a schematic side view of a header of the windrower of FIG. 1 according to another embodiment.
Figure 5:
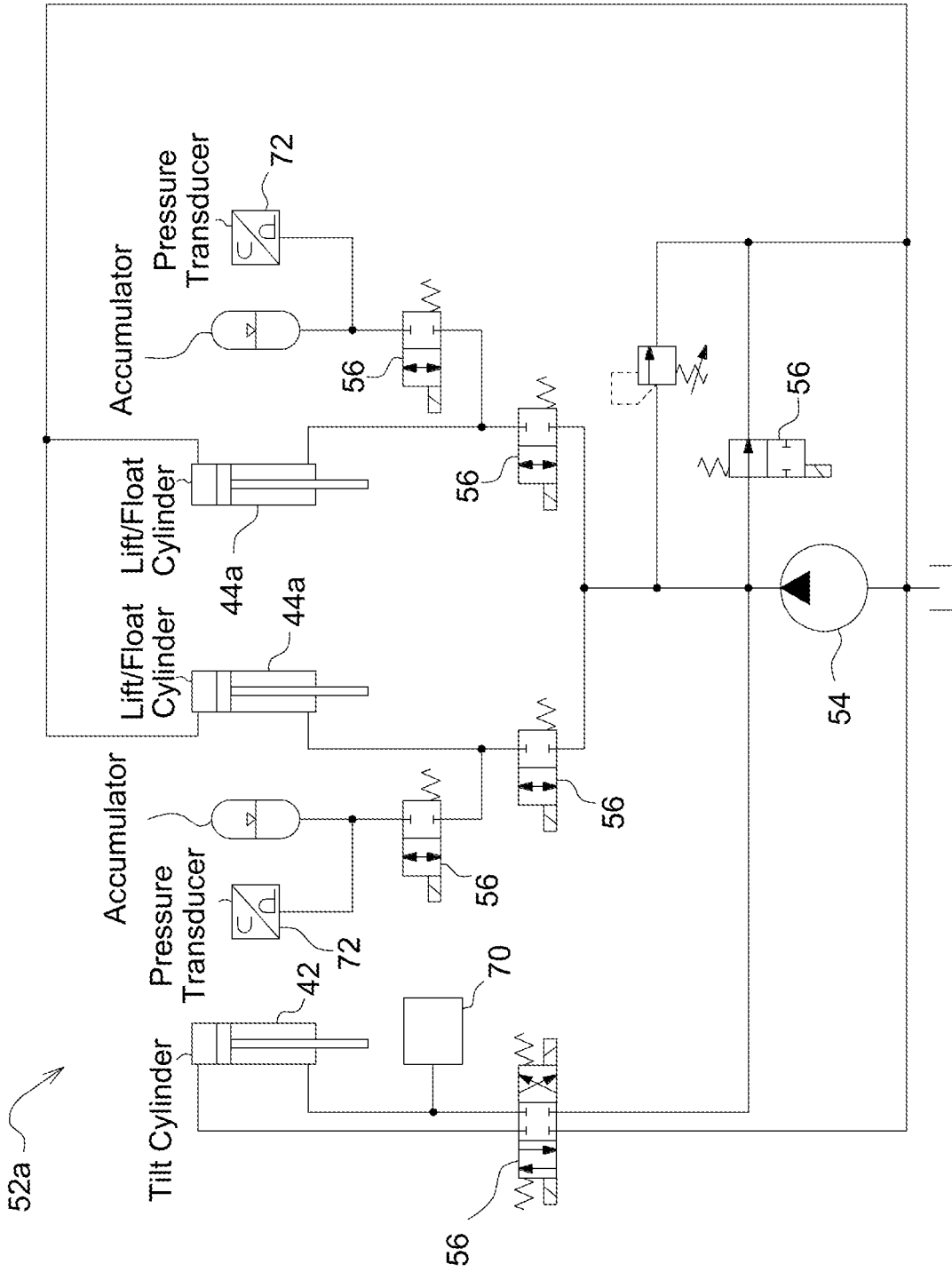
FIG. 5 is a schematic of a hydraulic system for the windrower of FIG. 1 according to another embodiment.

FIGS. 4 and 5 illustrate another embodiment of the windrower 10. The embodiment illustrated in FIGS. 4 and 5 includes the same elements previously described with respect to the embodiment of FIGS. 2 and 3, except that the embodiment of FIGS. 4 and 5 includes a hydraulic system 52*a* that differs from the hydraulic system 52 described above. Specifically, the hydraulic system 52*a* does not include a separate lift cylinder. Instead, the hydraulic system 52*a* includes a pair of combination float and lift cylinders 44*a* configured to support the weight of the header 14 to enable the header to follow the ground surface 50 over changing terrain, and they are further configured to raise or lower the header 14 relative to the ground surface 50. The combination float and lift cylinders 44*a* of the hydraulic system 52*a* perform the combined functions of both the float cylinders 44 and the tilt cylinder 42 of the hydraulic system 52 described above in connection with FIGS. 2 and 3.

Figure 6:
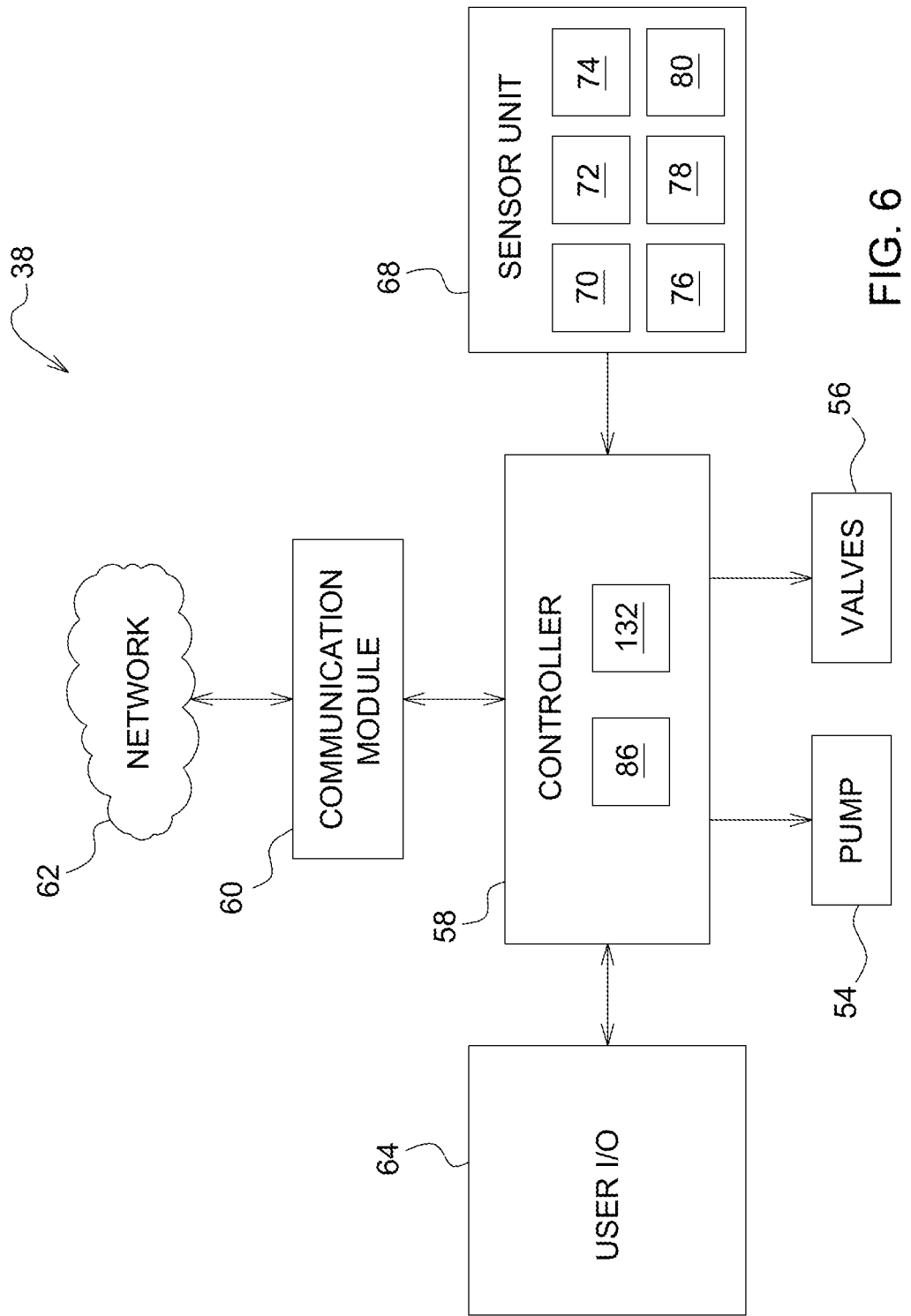
FIG. 6 is a schematic of a control system for the windrower of FIG. 1

FIG. 6 illustrates an embodiment of the control system 24 that is configured to control the operation of various components of the windrower 10, including either of the hydraulic systems 52 and 52*a* described above. The control system 24 includes a controller 58 with a plurality of inputs and outputs that are operable to receive and transmit information and commands to and from different components in the windrower 10. Communication between the controller 58 and the different components can be accomplished through a CAN bus, another communication link (e.g., wireless transceivers), or through a direct connection. The control system 24 also includes a communication module 60 configured to connect to and communicate with other devices (e.g., a computer, another work machine, etc.) through a network 62. The network 62 can be, for example, a wide area network ("WAN") (e.g., a global positioning system ("GPS"), a TCP/IP based network, a cellular network, etc.).

The control system 24 further includes a user input/output module 64 that includes one or more operator input mechanisms 65 in communication with the controller 58. The one or more operator input mechanisms 65 can include, for example, a joystick, throttle control mechanism, pedal, lever, switch, or other control mechanism. The operator input mechanisms 65 are located within the cab 20 of the windrower 10 and can be used to control the position of the header 14 by adjusting the hydraulic actuators 40. The user input/output module 64 can also include one or more input/output mechanisms such as, for example, a touch screen display device such as a control screen 66 (FIG. 17) located in the cab 20.

The controller 58 includes memory for storing software, logic, algorithms, programs, a set of instructions, etc. for controlling the valves 56 and other components of the windrower 10. The controller 58 also includes a processor for carrying out or executing the software, logic, algorithms, programs, set of instructions, etc. stored in the memory. The memory can store look-up tables, graphical representations of various functions, and other data or information for carrying out or executing the software, logic, algorithms, programs, set of instructions, etc.

The controller 58 is in communication with the valves 56 and can send control signals to the valves 56 and to the pump 54 to adjust the output or flowrate to the actuators 40 including the tilt cylinder 42, the float cylinders 44, and the lift cylinder 46, or in some embodiments, the combination float and lift cylinders 44*a*. The types of control signals and how the valves 56 are adjusted will vary dependent on the system. For example, one or more of the valves 56 can be an electrohydraulic servo valve that adjusts the flow rate of hydraulic fluid to the actuators 40 based on the received control signal.

A sensor unit 68 comprising one or more sensors can be associated with the actuators 40 or other components of the header 14. The sensor unit 68 can detect information relating to the header 14 and provide the detected information to the controller 58. For example, one or more sensors can detect information relating to actuator position, load experienced by the actuator, cylinder pressure, fluid temperature, or movement speed of the actuators, as well as header position or acceleration, or characteristics of the ground surface 50. Although described as a single unit related to the header 14, the sensor unit 68 can encompass sensors positioned at any position within the windrower 10 or associated with the windrower 10 to detect or record operating information.

With reference to FIG. 6, the sensor unit 68 includes a tilt pressure sensor 70 in communication with the tilt cylinder 42, and float pressure sensors 72 in communication with the float cylinders 44. The pressure sensors 70, 72 are used to measure the load on the tilt cylinder 42 and in the float cylinders 44, respectively. In some embodiments, the pressure sensors 70, 72 are pressure transducers.

FIGS. 2, 4, and 6 show a tilt position sensor 74 associated with the sensor unit 68. The tilt position sensor 74 is configured to detect or measure the tilt position of the header 14 relative to the chassis 16 and transmit that information to the controller 58. The tilt position sensor 74 can be configured to directly measure the tilt position of the header 14 or to indirectly measure the tilt position of the header 14 by the position or movement of the tilt cylinder 42. In one embodiment, the tilt position sensor 74 can be a rotary position sensor that measures the tilt position of the header 14 relative to the chassis 16. In another embodiment, the tilt position sensor 74 can be an in-cylinder position sensor that directly measures the position of the hydraulic piston in the tilt cylinder 42.

With reference to FIGS. 2, 4, and 6, the sensor unit 68 may also include one or more header height sensors 76 configured to detect or measure the height of the header 14 relative to the ground surface 50 and transmit that information to the controller 58. The header height sensors 76 can be configured to directly measure the height of the header 14 relative to the ground surface 50. Or, the header height sensors 76 can be configured to indirectly measure the height of the header 14 by the position or movement of the float cylinders 44, the tilt cylinder 42, or, in the embodiment shown in FIGS. 4 and 5, the combination float and lift cylinders 44*a*. In one embodiment, the header height sensors 76 can be rotary position sensors that measure the height of the header 14 relative to the chassis 16. In another embodiment, the header height sensors 76 can be in-cylinder position sensors that directly measure the position of the hydraulic piston in the tilt cylinder 42, or in each respective float cylinder 44 or in each respective combination float and lift cylinder 44*a*.

With reference to FIGS. 2, 4, and 6, in some embodiments, the sensor unit 68 can include an accelerometer 78 coupled to the header 14. The accelerometer 78 is configured to detect or measure the acceleration of the header 14 and transmit that information to the controller 58. In the same or other embodiments, the sensor unit 68 can include a camera 80 coupled to the windrower 10. The camera 80 can be forward, side, or rearward facing. Additional sensors may be associated with the sensor unit 68 and one or more additional sensor units can be incorporated into the control system 24.

During operation, an operator drives the windrower 10 along rows or passes in a field. The operator manipulates the one or more input mechanisms 65 to adjust the position and operation of the header 14, including the header height, the header tilt, and the header float pressure. If the windrower 10 encounters changes in the ground surface 50, such as obstacles 82 (FIGS. 2 and 4) or undulating terrain, the operator can make adjustments to overcome these changes using the input mechanisms 65 or the control screen 66.

FIG. 7 schematically illustrates an exemplary field map 84 that contains information about a corresponding field to be cut, including obstacles or changes in terrain in the field, their respective sizes or magnitudes, their respective locations, and the like. Field maps such as the field map 84 can be created by an obstacle detection and mapping module executable by the controller 58 during operation of the windrower 10. The field map 84 can be stored in a field map database, which can be stored locally (e.g., in the memory of the controller 58) or remotely (e.g., in a remote server accessible via the network 62). Examples of obstacle detection and mapping modules, and of field maps created by such obstacle detection and mapping modules, are disclosed in U.S. Nonprovisional patent application Ser. No. 17/008, 300, filed Aug. 31, 2020, entitled "OBSTACLE DETECTION AND FIELD MAPPING FOR A WORK VEHICLE", the entire contents of which is hereby incorporated by reference.

The field map 84 can be referenced by the controller 58 during operation of the windrower 10, and the controller 58 can be configured to make adjustments to, e.g., the tilt pressure, the float pressure, the header height, etc., based on information contained in the field map 84. The field map 84 can also be changed or updated by controller 58 when the controller 58 detects differences between the field map 84 and the corresponding field being cut (based on, e.g., signals from the sensor unit 68, operator inputs, information received via the communication module 60, etc.). The field map 84 can also be displayed on, e.g., the control screen 66 (FIG. 8) in the cab 20 and referenced by the operator during operation of the windrower 10. The displayed field map 84 comprises a graphical representation of a field to be cut by the windrower 10, and includes a start location 120, an end location 122, and a path of travel 124 traversed by the windrower 10 between the start and end locations 120, 122. The path of travel 124 is divided into rows or passes 126. The field map 84 also includes exemplary events 128a-128d located at discrete locations along the passes 126 of the path of travel 124. A first event 128a may include a "high impact" event representative of a large obstacle previously identified and stored in the field map database via the obstacle detection and mapping module 86 (FIG. 6). A second event 128b may include an "undulating terrain" event, a third event 128c may include a "hole" event, and a fourth event 128d may include a "medium impact" event. The displayed field map 84 may likewise be used by the operator to make adjustments during operation of the windrower 10, e.g., adjust the float pressure, the header tilt, the header height, etc. based on the location and associated information for each event 128a-128d.

FIG. 8 illustrates the operator input mechanisms 65 and the control screen 66 located inside the cab 20. The field map 84 may be displayed to the operator via the control screen 66, including the start location 120, the end location 122, the path of travel 124, the passes 126, and the events 128a-128d. In addition, the controller 58 may be configured to display an alert 130 associated with one of the events 128a-128d to alert the operator when the windrower 10 is approaching the event. In other embodiments, the field map 84 may be viewed from other devices, e.g., from a smartphone, a remote computer, etc.

With reference to FIG. 6, the controller includes a field learning and optimization module 132 that includes instructions that will adjust one or more of the float setting, the tilt setting, and the lift setting of the header 14 to optimize operation of the windrower 10, based on information contained field maps 84. The field learning and optimization module 132 will also identify differences between the information stored in the field map 84 and information detected while operating within the corresponding field, and update the field map 84 with new information as appropriate. Additional, non-limiting examples of a similar field learning and optimization module are disclosed in U.S. Nonprovisional patent application Ser. No. 17/008,306, filed Aug. 31, 2020, entitled "TILT SYSTEM FIELD LEARNING AND OPTIMIZATION FOR A WORK VEHICLE", the entire contents of which is hereby incorporated by reference.

Figure 9:
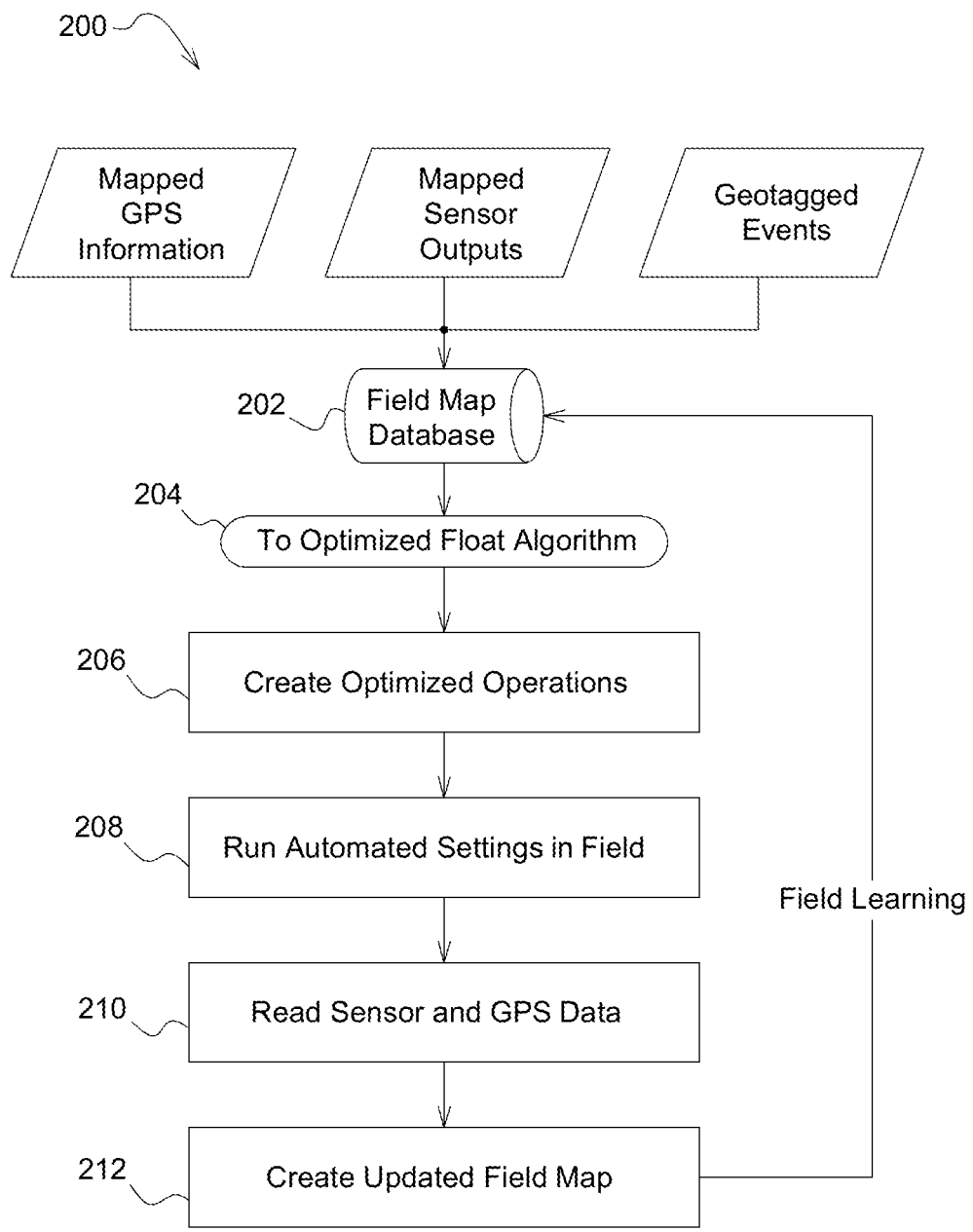

FIG. 9 illustrates a partial flow diagram of a first set of instructions 200 of the field learning and optimization module 132 to be executed by the controller 58 to use mapped information stored in the field map database to create and run optimized settings for the windrower 10 in a field. While the windrower 10 is operating in the field, the set of instructions 200 also reads sensor and GPS data from the sensor unit 68 and the communication module 60 and updates the information in the field map database as appropriate. The field map database includes field maps 84 generated for the fields to be cut, with each field map 84 including information such as mapped GPS information, mapped sensor outputs, and geotagged events. The controller 58 accesses the field map information stored in the field map database (step 202) and executes an "Optimized Header Float" algorithm (step 204) to create optimized operational settings for the windrower 10 in the field (step 206). The "Optimized Header Float" algorithm may provide different automation techniques to fit a specific operator need, such as minimizing wear and damage of the header 14. The "Optimized Header Float" algorithm can include different goal-based optimization algorithms for creating the different automation techniques, such as a "Desired Float Pressure" algorithm 400, a "Header Damage Prevention" algorithm 500, and a "Balanced Cut Height" algorithm (FIG. 10), which will be discussed in further detail herein. Once the optimized operational settings have been created, the controller 58 runs the settings in the field to be cut (step 208). Specifically, the controller 58 monitors the GPS location of the windrower 10 and implements the optimized operational settings based on the real time GPS location (e.g., to account for obstacles or other changes in the terrain based on the field map information). The controller 58 also reads sensor signals and GPS data received from the sensor unit 68 and the communication module 60, respectively (step 210). The controller 58 also creates an updated field map 84 based on differences between the sensor signals and GPS data received (step 212), and stores the updated field map 84 in the field map database.

Figure 10:
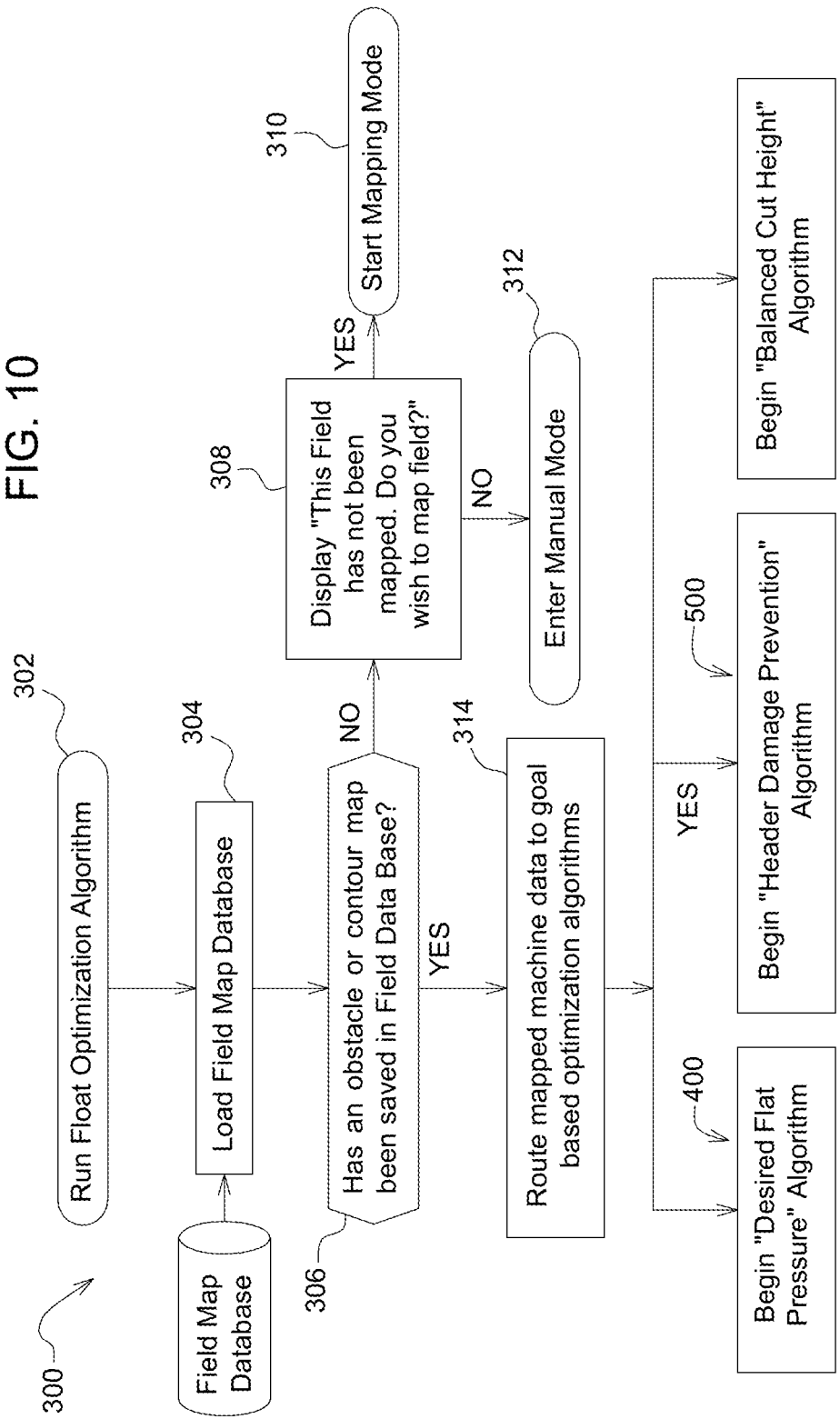

FIG. 10 shows a partial flow diagram of a second set of instructions 300 of the field learning and optimization module 132 comprising a "Float Optimization" algorithm 300. When executed by the controller 58, the "Float Optimization" algorithm 300 loads a field map 84 from the field map database and routes the mapped field information in the field map 84 to one of the "Optimized Header Float" algorithms. The controller 58 runs the "Float Optimization" algorithm 300 (step 302), and loads the field map database (which can be loaded from, e.g., the memory of the controller 58, or a remote server accessed via the network 62) (step 304). Next, the controller 58 determines whether a field map 84 for the field to be cut is saved in the field map database (step 306). If no field map 84 is stored in the database, the controller 58 notifies the operator by displaying an alert to the control screen 66, and further prompts the operator to indicate whether a new field map 84 for the field should be generated (step 308). If the operator indicates a desire to map the field, the controller 58 initiates a mapping mode by executing the obstacle detection and field mapping module 86 (discussed above) (step 310). If the operator does not indicate a desire to map the field, the controller 58 ends the "Float Optimization" algorithm 300 and enters a manual mode (step 312). If a field map 84 for the field is found in the field map database, then the controller 58 routes the mapped field information to one of the "Optimized Header Float" algorithms (i.e., the goal-based optimization algorithms including the "Desired Float Pressure" algorithm 400, the "Header Damage Prevention" algorithm 500, and the "Balanced Cut Height" algorithm) based on a selection by the operator (step 314).

Figure 11:
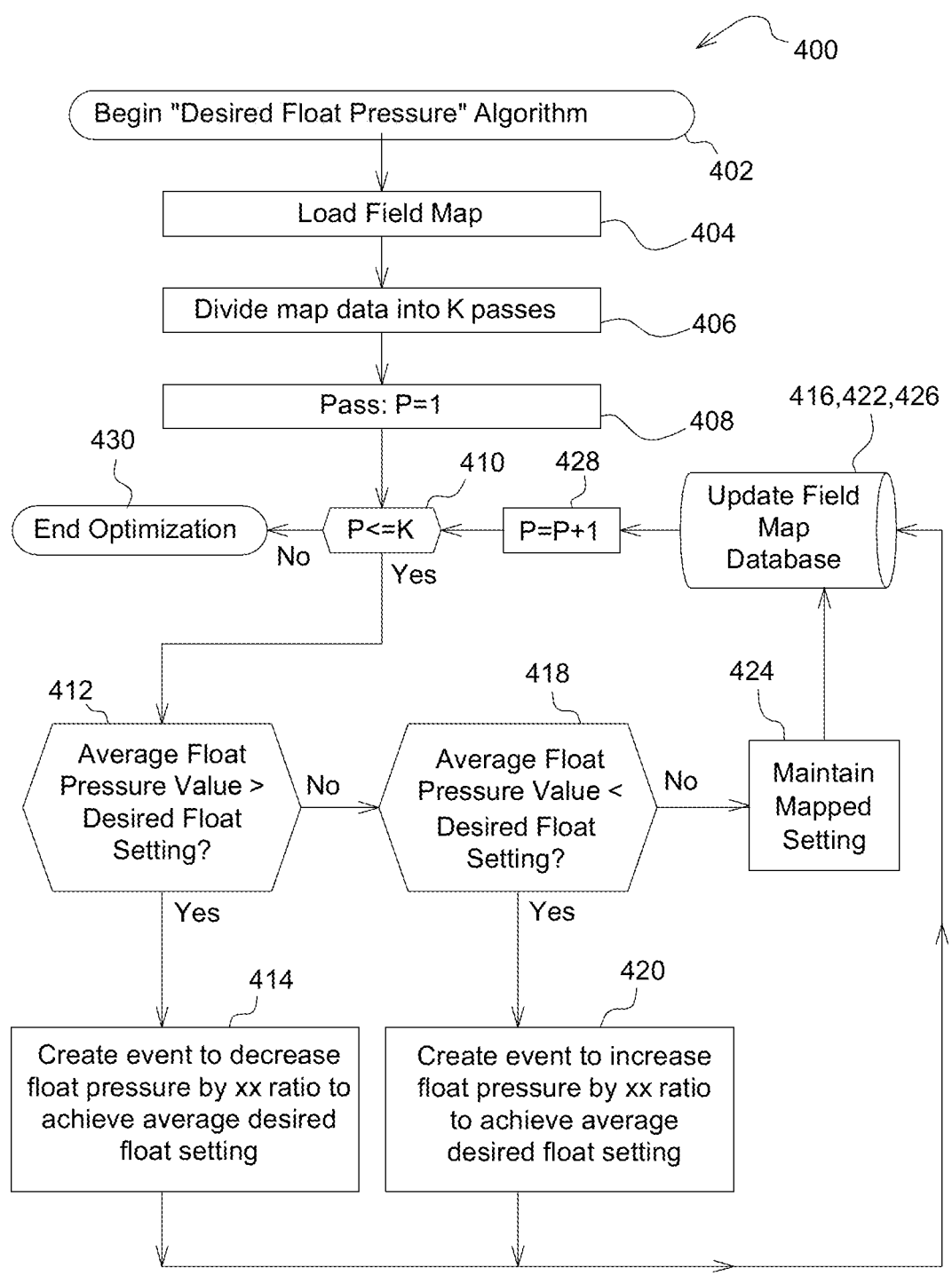

FIG. 11 shows a partial flow diagram of a third set of instructions 400 of the field learning and optimization module 132 comprising the "Desired Float Pressure" algorithm 400. When executed by the controller 58, the "Desired Float Pressure" algorithm 400 creates an automation technique that maintains a desired float pressure during operation of the windrower 10. When the "Desired Float Pressure" algorithm 400 is selected (e.g., via operator input), the controller 58 begins the "Desired Float Pressure" algorithm 400 (step 402) and loads the field map 84 corresponding to the field to be cut from the field map database (step 404). Next, the controller 58 analyzes the field map 84 to divide the field map 84 into K number of passes 126 (FIG. 7) (step 406), and assigns a pass variable P to the passes 126 (FIG. 7), initialized to 1 (step 408). The controller 58 next determines whether the pass variable P is less than or equal to the number of passes K (step 410). If so, the controller 58 determines whether an average float pressure of the header 14 (e.g., detected by the sensor unit 68) for the current pass P is greater than the desired float pressure setting selected by the operator (step 412). If so, the controller 58 creates an event to decrease the float pressure (e.g., by a ratio) to achieve the desired float pressure setting (step 414), and updates the field map database with the new mapped float pressure setting for the given pass P (step 416). If not, the controller 58 next determines whether the average float pressure for the current pass P is less than the desired float pressure setting (step 418), and if so, then the controller 58 creates an event to increase the float pressure (e.g., by a ratio) to achieve the desired float pressure setting (step 420), and updates the field map database with the new mapped float pressure setting for the given pass P (step 422). If the average float pressure for the given pass P is not less than the desired float pressure, then the existing mapped float settings (i.e., for the actuators 40 utilized by the windrower 10 to adjust and maintain the float pressure) are maintained for the given pass P (step 424), and the field map database is updated (step 426). Next, the controller 58 updates the pass variable P to reflect beginning a new pass (step 428), and repeats steps 410-428 for each pass of the field. Returning to step 410, if the pass variable P is not less than or equal to the number of passes K, then the controller 58 ends the "Desired Float Pressure" algorithm 400.

An increase or decrease in the average float pressure for the given pass P can occur due to degradation over the course of the operation of the windrower 10. At steps 412 and 418, a dead band filter may be used to filter relatively minor deviations of the average float pressure from the desired float pressure, such that the mapped float settings are maintained for minor deviations.

Figure 12:
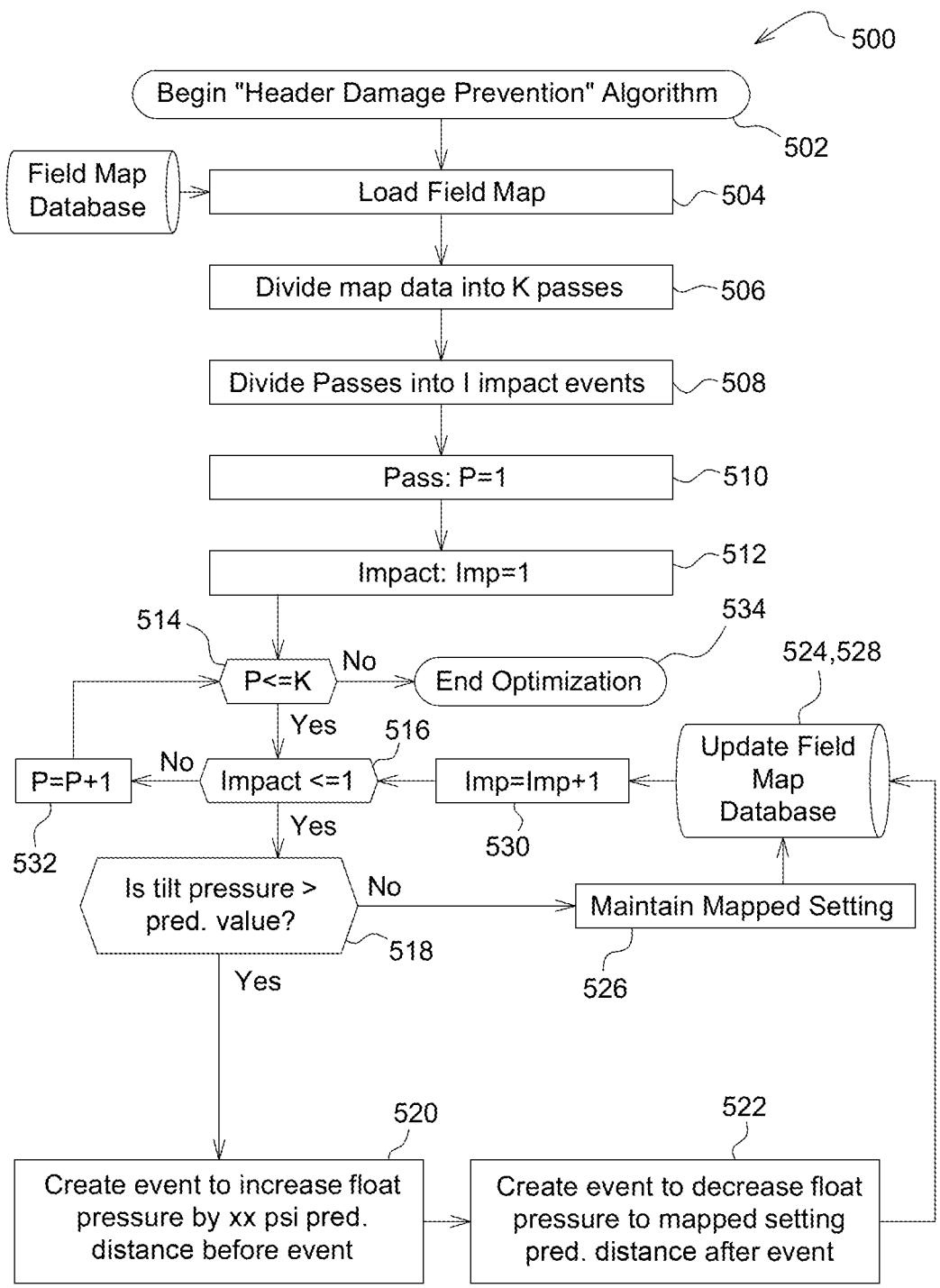

FIG. 12 shows a partial flow diagram of a fourth set of instructions 500 of the field learning and optimization module 132 comprising the "Header Damage Prevention" algorithm 500. When executed by the controller 58, the "Header Damage Prevention" algorithm 500 creates an automation technique that selectively increases the float pressure during operation of the windrower 10. By increasing the float pressure when traversing obstacles mapped in the field map 84, an impact force between the header 14 and the obstacle may be reduced to prevent damage to the header 14. When executing the "Header Damage Prevention" algorithm 500, the controller 58 monitors the tilt pressure for mapped impact events (such as the events 128a-128d described above) to determine whether the float pressure should be adjusted. If the controller 58 determines that the mapped impact event warrants an adjustment to the float pressure, the controller 58 increases the float pressure by a given ratio at a predetermined distance before the location of the impact event, and subsequently decreases the float pressure back to the mapped setting at a predetermined distance after the location of the impact event.

When the "Header Damage Prevention" algorithm 500 is selected (e.g., via operator input), the controller 58 begins the "Header Damage Prevention" algorithm 500 (step 502) and loads the field map 84 corresponding to the field to be cut from the field map database (step 504). Next, the controller 58 analyzes the field map 84 to divide the field map 84 into K number of passes 126 (FIG. 7) (step 506), and divides each pass 126 into/number of impact events, such as the events 128a-128d described above (step 508). The controller 58 assigns a pass variable P to the passes 126, initialized to 1 (step 510), and assigns an impact event variable Imp to the impact events, initialized to 1 (step 512). The controller 58 next determines whether the pass variable P is less than or equal to the number of passes K (step 514). If so, the controller 58 determines whether the impact event variable Imp is less than or equal to the number of impact events I (step 516). If so, the controller 58 determines whether the mapped tilt pressure of the header 14 (e.g., stored in the field map 84) for the next upcoming impact event Imp is greater than a predetermined threshold tilt pressure value (step 518). If so, the controller 58 creates an event to increase the float pressure by a predetermined ratio and at a predetermined distance prior to the upcoming impact event Imp (step 520). The controller 58 also creates a corresponding subsequent event to decrease the float pressure back to the mapped setting at a predetermined distance after the impact event Imp (step 522). The controller 58 then updates the field map database to include the pair of events generated at steps 520 and 522 for the given mapped impact event Imp (step 524). Returning to step 518, if the mapped tilt pressure of the header 14 (e.g., stored in the field map 84) for the next upcoming impact event Imp is not greater than a predetermined threshold tilt pressure value, then the existing mapped float settings (i.e., for the actuators 40 utilized by the windrower 10 to adjust and maintain the float pressure) are maintained for the given pass P (step 526), and the field map database is updated (step 528). Next, the controller 58 updates the impact variable Imp to reflect the next mapped impact event Imp+1 (step 530), and repeats steps 516-530 for each mapped impact event Imp in the given pass P of the field. Returning to step 516, if the impact variable Imp is not less than or equal to the number of impact events I, then the controller 58 updates the pass variable P to reflect beginning a new pass and returns to step 514 (step 532). If, at step 514, the pass variable P is not less than or equal to the number of passes K, then the controller 58 ends the "Header Damage Prevention" algorithm 500 (step 534).

Figure 13:
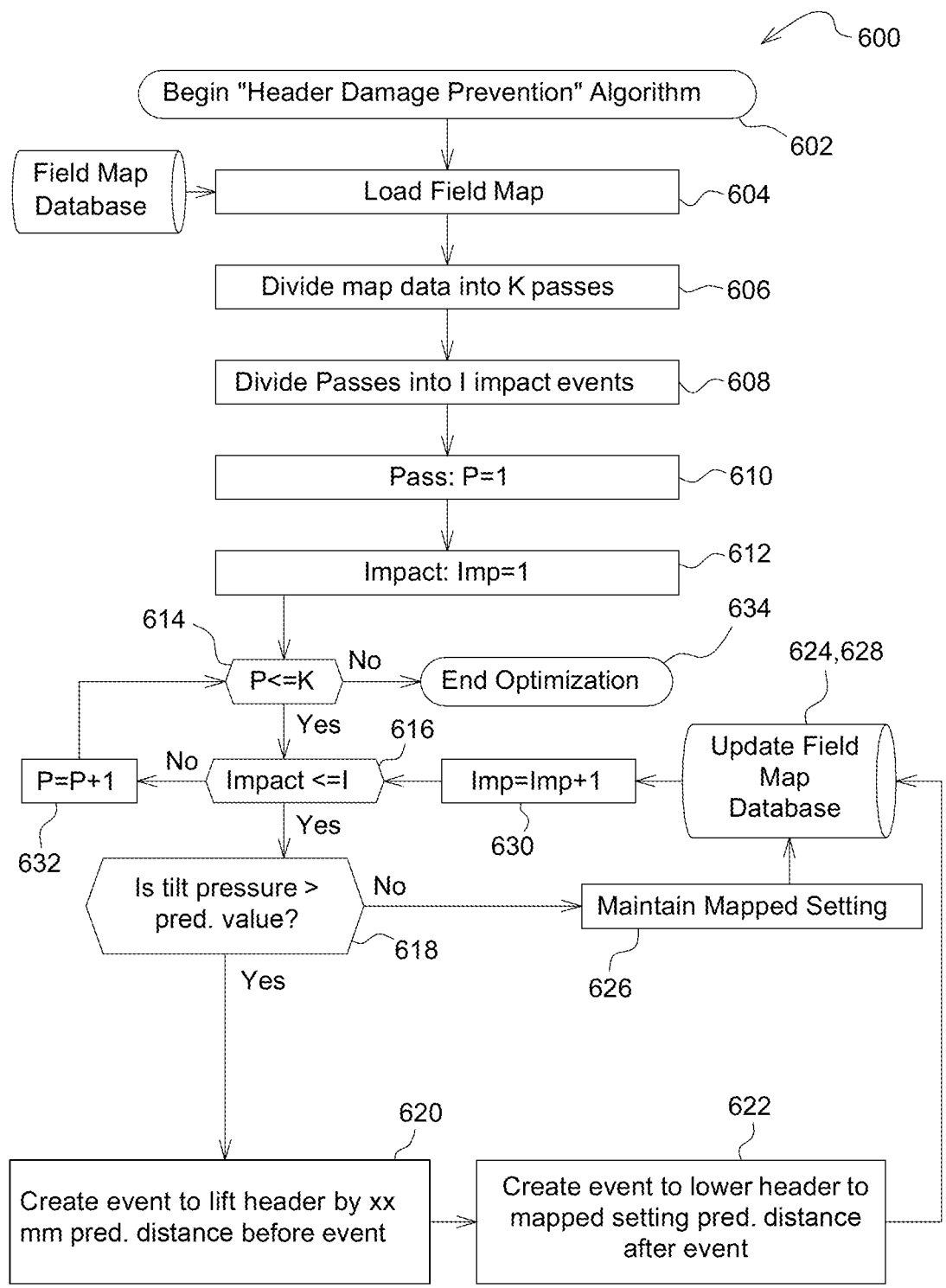

FIG. 13 shows a partial flow diagram of a fifth set of instructions 600 of the field learning and optimization module 132 comprising a "Header Lift Protection" algorithm 600. When executed by the controller 58, the "Header Lift Protection" algorithm 600 creates an automation technique that selectively lifts and lowers the header 14 during operation of the windrower 10. By lifting the header 14 (e.g., via the lift cylinder 44) when traversing obstacles mapped in the field map 84, an impact force between the header 14 and the obstacle may be reduced or eliminated to prevent damage to the header 14. When executing the "Header Lift Protection" algorithm 600, the controller 58 monitors the tilt pressure for mapped impact events (such as the events 128a-128d described above) to determine whether the header 14 should be lifted. If the controller 58 determines that the mapped impact event warrants lifting the header 14, the controller 58 proceeds to lift the header 14 by a given ratio at a predetermined distance before the location of the impact event, and subsequently lowers the header 14 back to the mapped setting at a predetermined distance after the location of the impact event.

When the "Header Lift Protection" algorithm 600 is selected (e.g., via operator input), the controller 58 begins the "Header Lift Protection" algorithm 600 (step 602) and loads the field map 84 corresponding to the field to be cut from the field map database (step 604). Next, the controller 58 analyzes the field map 84 to divide the field map 84 into K number of passes 126 (FIG. 7) (step 606), and divides each pass 126 into I number of impact events, such as the events 128a-128d described above (step 608). The controller 58 assigns a pass variable P to the passes 126, initialized to 1 (step 610), and assigns an impact variable Imp to the impact events, initialized to 1 (step 612). The controller 58 next determines whether the pass variable P is less than or equal to the number of passes K (step 614). If so, the controller 58 determines whether the impact variable Imp is less than or equal to the number of impact events I (step 616). If so, the controller 58 determines whether the mapped tilt pressure of the header 14 (e.g., stored in the field map 84) for the next upcoming impact event Imp is greater than a predetermined threshold tilt pressure value (step 618). If so, the controller 58 creates an event to raise the header 14 by a predetermined ratio and at a predetermined distance prior to the upcoming impact event Imp (step 620). The controller 58 also creates a corresponding subsequent event to lower the header 14 back to the mapped setting at a predetermined distance after the impact event Imp (step 622). The controller 58 then updates the field map database to include the pair of events generated at steps 620 and 622 for the given mapped impact event Imp (step 624). Returning to step 618, if the mapped tilt pressure of the header 14 (e.g., stored in the field map 84) for the next upcoming impact event Imp is not greater than a predetermined threshold tilt pressure value, then the existing mapped lift settings (i.e., for the actuators 40 utilized by the windrower 10 to lift and lower the header 14) are maintained for the given pass P (step 626), and the field map database is updated (step 628). Next, the controller 58 updates the impact variable Imp to reflect the next mapped impact event Imp+1 (step 630), and repeats steps 616-630 for each mapped impact event Imp for the given pass P of the field. Returning to step 616, if the impact variable Imp is not less than or equal to the number of impact events I for the given pass P, then the controller 58 updates the pass variable P to reflect beginning a new pass and returns to step 614 (step 632). If, at step 614, the pass variable P is not less than or equal to the number of passes K, then the controller 58 ends the "Header Lift Protection" algorithm 600 (step 634).

Figure 14:
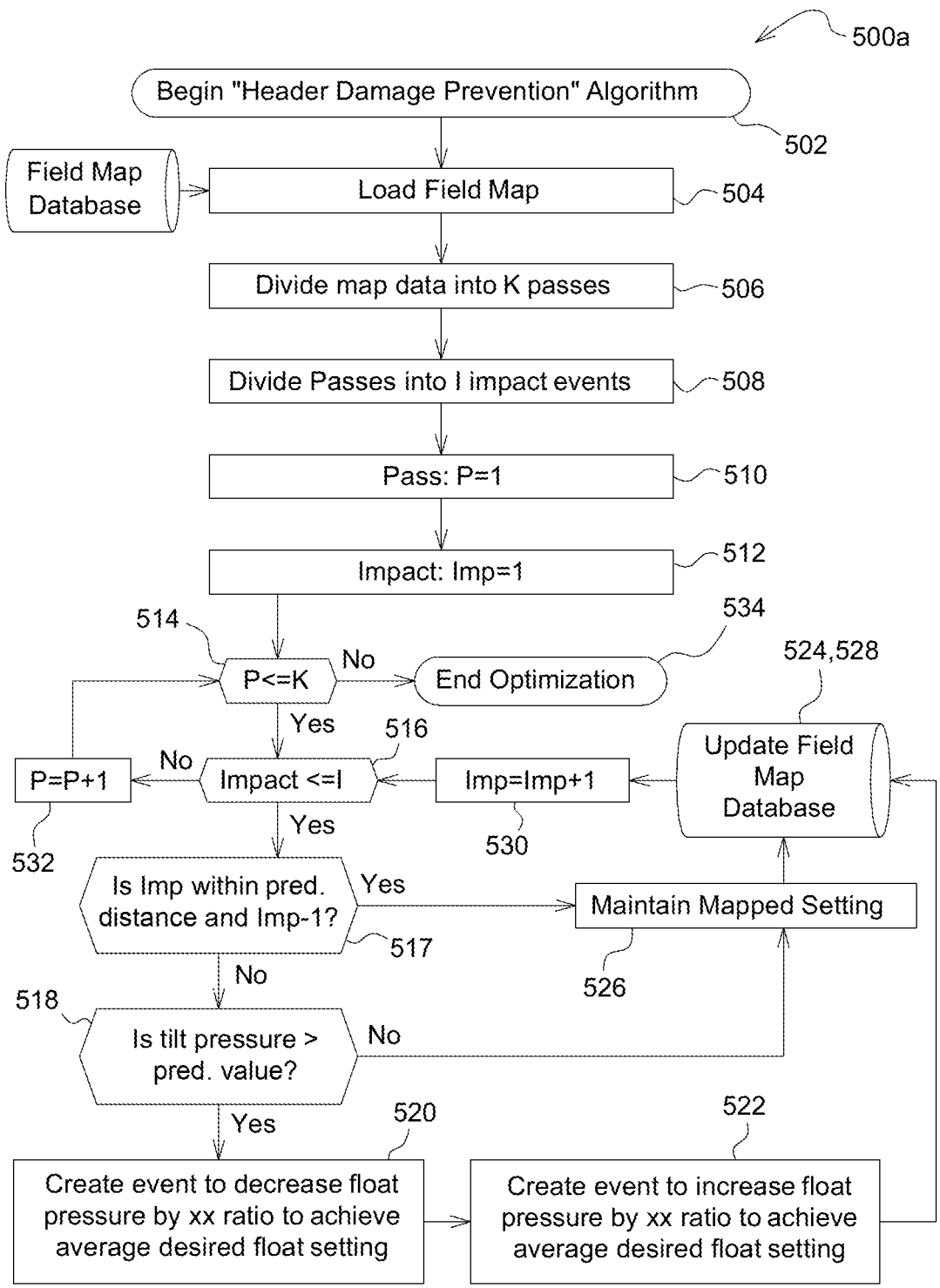

FIG. 14 shows a partial flow diagram of a sixth set of instructions 500a of the field learning and optimization module 132 comprising a modified "Header Damage Prevention" algorithm 500a substantially similar to the "Header Damage Prevention" algorithm 500 discussed above, but further including a filter for each impact event Imp to prevent nuisance adjustments. The steps of the modified "Header Damage Prevention" algorithm 500a that are identical to the steps of the "Header Damage Prevention" algorithm 500 discussed above include the same reference numerals in FIG. 14, and a discussion of these steps is not repeated in connection with the modified "Header Damage Prevention" algorithm 500a.

When executed by the controller 58, the modified "Header Damage Prevention" algorithm 500a creates an automation technique that selectively reduces the float pressure during operation of the windrower 10. During execution of the modified the "Header Damage Prevention" algorithm 500, after the controller 58 determines whether the impact variable Imp is less than or equal to the number of impact events I (step 516), the controller then determines whether the next upcoming impact event Imp is within a predetermined distance from the preceding impact event Imp−1 (step 517). If so, the controller 58 proceeds to step 526 and the existing mapped float settings (i.e., for the actuators 40 utilized by the windrower 10 to adjust and maintain the float pressure) are maintained for the upcoming impact event Imp (step 526). If not, the controller 58 proceeds to step 518 and determines whether the mapped tilt pressure of the header 14 (e.g., stored in the field map 84) for the next upcoming impact event Imp is greater than a predetermined threshold tilt pressure value (step 518).

FIG. 15 shows a partial flow diagram of a seventh set of instructions 700 of the field learning and optimization module 132 that allows the operator to enable automatic float operation, whereby the controller 58 controls the actuators 40 to autonomously perform adjustments to the header float pressure while the windrower 10 is operating in a field. When the controller 58 executes the seventh set of instructions 700, the operator may select a goal (e.g., obstacle alert, header damage prevention, or balanced cut height) that the operator would like the windrower 10 to perform for a given field map 84. While the windrower 10 is operating, the controller 58 will automatically make adjustments to the header float pressure via the actuators 40 based on the updated field map 84 created by running the goal-based optimization algorithms discussed above, such as the "Desired Float Pressure" algorithm 400 and the "Header Damage Prevention" algorithm 500, as well as other goal-based optimization algorithms such as the "Balanced Cut Height" algorithm.

When the sixth set of instructions 700 is executed, the controller 58 loads the field map 84 corresponding to the field to be cut from the field map database (step 702). Next, the controller 58 determines whether the operator has selected (e.g., via the control screen 66) a float optimization mode (step 704). If not, the controller 58 proceeds to enter a manual float mode whereby the float settings are controlled by operator input directly (step 706). If so, the controller 58 displays the optimization schemes available to the operator (e.g., via the control screen 66) (step 708). The controller 58 next determines whether a particular float optimization mode has been selected by the operator (e.g., a balanced mode, a damage prevention mode, or a desired setting mode) (steps 710, 712, and 714). If so, the controller 58 proceeds to run the selected float optimization mode (e.g., the "Balanced Cut Height" algorithm, the "Header Damage Prevention" algorithm 500, or an "Obstacle Alert" algorithm) (steps 716, 718, and 720). If the controller 58 determines that the operator has not selected a specific float optimization mode after a predetermined time delay period has passed (step 722), then the controller 58 returns to step 704.

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present disclosure, and are not intended to limit the structure of the exemplary embodiments of the present disclosure to any particular position or orientation. Terms of degree, such as "substantially" or "approximately" are understood by those of ordinary skill to refer to reasonable ranges outside of the given value, for example, general tolerances or resolutions associated with manufacturing, assembly, and use of the described embodiments and components.

What is claimed is:

1. A work machine comprising:
   a chassis;
   a work implement movably coupled to the chassis, the work implement configured to perform a field-engaging function;
   an actuator coupled to the work implement and configured to adjust a position of the work implement relative to a ground surface; and
   a controller in communication with a communication module, the controller configured to:
   monitor a location of the work machine via the communication module,
   load a field map from a field map database, the field map identifying spatial information about a corresponding field and a fluid pressure of a hydraulic fluid acting on the actuator, the fluid pressure being associated with the spatial information,
   partition the spatial information into at least one pass traversable by the work machine in the field,
   determine whether an average value of the fluid pressure for the at least one pass is greater than or less than a predetermined value,
   in response to the average value of the fluid pressure for the at least one pass being greater than the predetermined value, create a first adjustment event to adjust the actuator in response to the location of the work machine moving within the at least one pass, and
   in response to the average value of the fluid pressure for the at least one pass being less than the predetermined value, create a second adjustment event to adjust the actuator in response to the location of the work machine moving within the at least one pass.

2. The work machine of claim 1, wherein the actuator comprises a float cylinder configured to adjust a float pressure of the work implement.

3. The work machine of claim 2, wherein the first adjustment event to adjust the float cylinder further comprises increasing the float pressure of the work implement via the float cylinder.

4. The work machine of claim 1, wherein the controller is further configured to update the field map to include the first and second adjustment events and upload the updated field map to the field map database.

5. The work machine of claim 2, wherein the second adjustment event to adjust the float cylinder further comprises decreasing the float pressure of the work implement via the float cylinder.

6. The work machine of claim 1, wherein the controller is further configured to maintain a mapped setting for the actuator in response to the average value of the fluid pressure for the at least one pass being equal to the predetermined value.

7. The work machine of claim 1, wherein the at least one pass comprises a first pass and a second pass, and the controller is configured to create one of the first adjustment event and the second adjustment event for each of the first pass and the second pass.

8. A work machine comprising:
   a chassis;
   a work implement movably coupled to the chassis, the work implement configured to perform a field-engaging function;
   an actuator coupled to the work implement and configured to adjust a position of the work implement relative to a ground surface; and
   a controller in communication with a communication module, the controller configured to:
   monitor a location of the work machine via the communication module,
   load a field map from a field map database, the field map identifying spatial information about a corresponding field and at least one impact event associated with the spatial information, the at least one impact event comprising a geotagged location and a characteristic of the work machine associated with the geotagged location,
   partition the spatial information into at least one pass traversable by the work machine in the field, and attribute the at least one impact event to the at least one pass, and
   determine whether the characteristic of the work machine for the at least one impact event is greater than or less than a predetermined value,
   in response to the characteristic of the work machine for the at least one impact event being greater than the predetermined value, create a first adjustment event to adjust the actuator in response to the location of the work machine moving within the at least one pass and approaching within a predetermined distance from the geotagged location, and in response to the characteristic of the work machine for the at least one impact event being less than the predetermined value, create a second adjustment event to adjust the actuator in response to the location of the work machine moving within the at least one pass and approaching within the predetermined distance from the geotagged location.

9. The work machine of claim 8, further comprising a tilt cylinder coupled to the work implement, and wherein the characteristic of the work machine is a fluid pressure of a hydraulic fluid acting within the tilt cylinder.

10. The work machine of claim 9, wherein the actuator comprises a float cylinder configured to adjust a float pressure of the work implement.

11. The work machine of claim 9, wherein the actuator comprises a lift cylinder configured to adjust a height of the work implement relative to the ground surface.

12. The work machine of claim 8, wherein the at least one pass comprises a first pass and a second pass, and the controller is configured to create one of the first adjustment event and the second adjustment event for each of the first pass and the second pass.

13. The work machine of claim 8, wherein the controller is further configured to update the field map to include the first and second adjustment events and upload the updated field map to the field map database.

14. A work machine comprising:
a chassis;
a work implement movably coupled to the chassis, the work implement configured to perform a field-engaging function;
an actuator coupled to the work implement and configured to adjust a position of the work implement relative to a ground surface; and
a controller in communication with a communication module, the controller configured to:
monitor a location of the work machine via the communication module,
load a field map from a field map database, the field map identifying:
spatial information about a corresponding field,
a first impact event associated with the spatial information, the first impact event comprising a first geotagged location, and
a second impact event associated with the spatial information, the second impact event comprising a second geotagged location,
partition the spatial information into at least one pass traversable by the work machine in the field along a travel direction, and attribute the first geotagged location and the second geotagged location to the at least one pass sequentially along the travel direction,
determine whether the second geotagged location is located within a predetermined minimum distance from the first geotagged location along the travel direction, and
in response to the second geotagged location being located within a predetermined minimum distance from the first geotagged location along the travel direction, maintain a mapped setting of the actuator in response to the location of the work machine moving within the at least one pass and approaching within a predetermined distance from the second geotagged location along the travel direction.

15. The work machine of claim 14, wherein the controller is further configured to update the field map to include the mapped setting of the actuator and upload the updated field map to the field map database.

16. The work machine of claim 14, wherein the second impact event further comprises a characteristic of the work machine associated with the second geotagged location, and wherein the controller is further configured to:
determine whether the second geotagged location is located within the predetermined minimum distance from the first geotagged location along the travel direction,
in response to the second geotagged location not being located within the predetermined minimum distance from the first geotagged location along the travel direction, determine whether the characteristic of the work machine for the at least one impact event is greater than a predetermined value, and
in response to the characteristic of the work machine for the at least one impact event being greater than a predetermined value, create an adjustment event to adjust the actuator in response to the location of the work machine moving within the at least one pass and approaching within a predetermined distance from the second geotagged location.

17. The work machine of claim 16, further comprising a tilt cylinder coupled to the work implement, and wherein the characteristic of the work machine is a fluid pressure of a hydraulic fluid acting within the tilt cylinder.

18. The work machine of claim 17, wherein the actuator comprises a float cylinder configured to adjust a float pressure of the work implement.

19. The work machine of claim 17, wherein the actuator comprises a lift cylinder configured to adjust a height of the work implement relative to the ground surface.

* * * * *